US006485695B1

(12) United States Patent
Koch et al.

(10) Patent No.: US 6,485,695 B1
(45) Date of Patent: Nov. 26, 2002

(54) METHOD AND APPARATUS FOR PREPARING BI-213 FOR HUMAN THERAPEUTIC USE

(75) Inventors: Lothar Koch, Weingarten (DE); Christos Apostolidis, Heidelberg (DE); Roger Molinet, Linkenheim (DE); Bruno Brandalise, Linkenheim (DE); Willem Janssens, Forst (DE); Jacques Van Geel, Ettlingen-Oberweier (DE)

(73) Assignee: European Community (EC) (LU)

( * ) Notice: Subject to any disclaimer, the term of this patent is extended or adjusted under 35 U.S.C. 154(b) by 0 days.

(21) Appl. No.: 09/530,670

(22) PCT Filed: Jun. 14, 1999

(86) PCT No.: PCT/EP99/04096

§ 371 (c)(1), (2), (4) Date: May 4, 2000

(87) PCT Pub. No.: WO99/67792

PCT Pub. Date: Dec. 29, 1999

(30) Foreign Application Priority Data

Jun. 22, 1998 (EP) ........................................... 98111442

(51) Int. Cl.[7] ........................ C22B 30/00; C22B 60/00; G01N 1/00

(52) U.S. Cl. .............................. 423/2; 423/7; 423/249; 250/432 PD

(58) Field of Search ............................... 423/2, 3, 249, 423/DIG. 7, 6, 7; 250/432 PD

(56) References Cited

U.S. PATENT DOCUMENTS 4,011,307 A 3/1977 Lambrecht et al.
5,355,394 A * 10/1994 Van Geel et al. ............... 423/3
5,749,042 A * 5/1998 Bray et al. ..................... 423/2
5,854,968 A * 12/1998 Horwitz et al. ................ 423/6
6,153,154 A * 11/2000 Egorov et al. ................. 423/6

FOREIGN PATENT DOCUMENTS

EP 585986 A1 3/1994

OTHER PUBLICATIONS

"The contribution of European research to the Treatment of Leukemia", *NEWSLINE*, Brussels, Feb. 20, 1997, Available from Internet: www.health.fgov.be/WHI3/periodical/months/wwhv1n3tekst/240297B4.htm, 4 pgs.

"Une guerre nucléaire contre le cancer", *Transfert & Innovation Technologiques—Etude des Cas*, Jan. 1998, Available from Internet: www.cordis.lu/itt/ittt–fr/98–1/case.htm, 3 pgs.

Lacy, Jeffrey L. et al., "Development and Clinical Performance of an Automated, Portable Tungsten–178/Tantalum–178 Generator", *Journal of Nuclear Medicine*, v32, N11, Nov. 1, 1991, pp. 2158–2161.

Boll, R. A. et al., "The$^{225}$ Ac/$^{213}$Bi Biomedical Generator", *Transactions of the American Nuclear Society–1997 Winter Meeting of American Nuclear Society*, Albuquerque, NM, Nov. 16–20, 1997, V77, pp. 523–524.

* cited by examiner

*Primary Examiner*—Steven Bos
(74) *Attorney, Agent, or Firm*—Sughrue Mion, PLLC

(57) ABSTRACT

This invention relates to a method and an apparatus for preparing Bi-213 to be integrated in a radioimmunocojugate for human therapeutic use. According to the invention the method comprises the sequence of steps as follows: a) an ampoule 5 containing colloid-free actinium-225, obtained from drying an actinium nitrate solution, is loaded into a container 20 provided with radiation panels 21; b) a dissolving medium is poured into the ampoule 5; c) the solution obtained in the ampoule is transferred into an ion exchange column 6; d) an elution medium is circulated through the column 6; e) the eluate containing eluted Bi-213 is pumped towards a vial 10 for quantification and quality control.

5 Claims, 1 Drawing Sheet

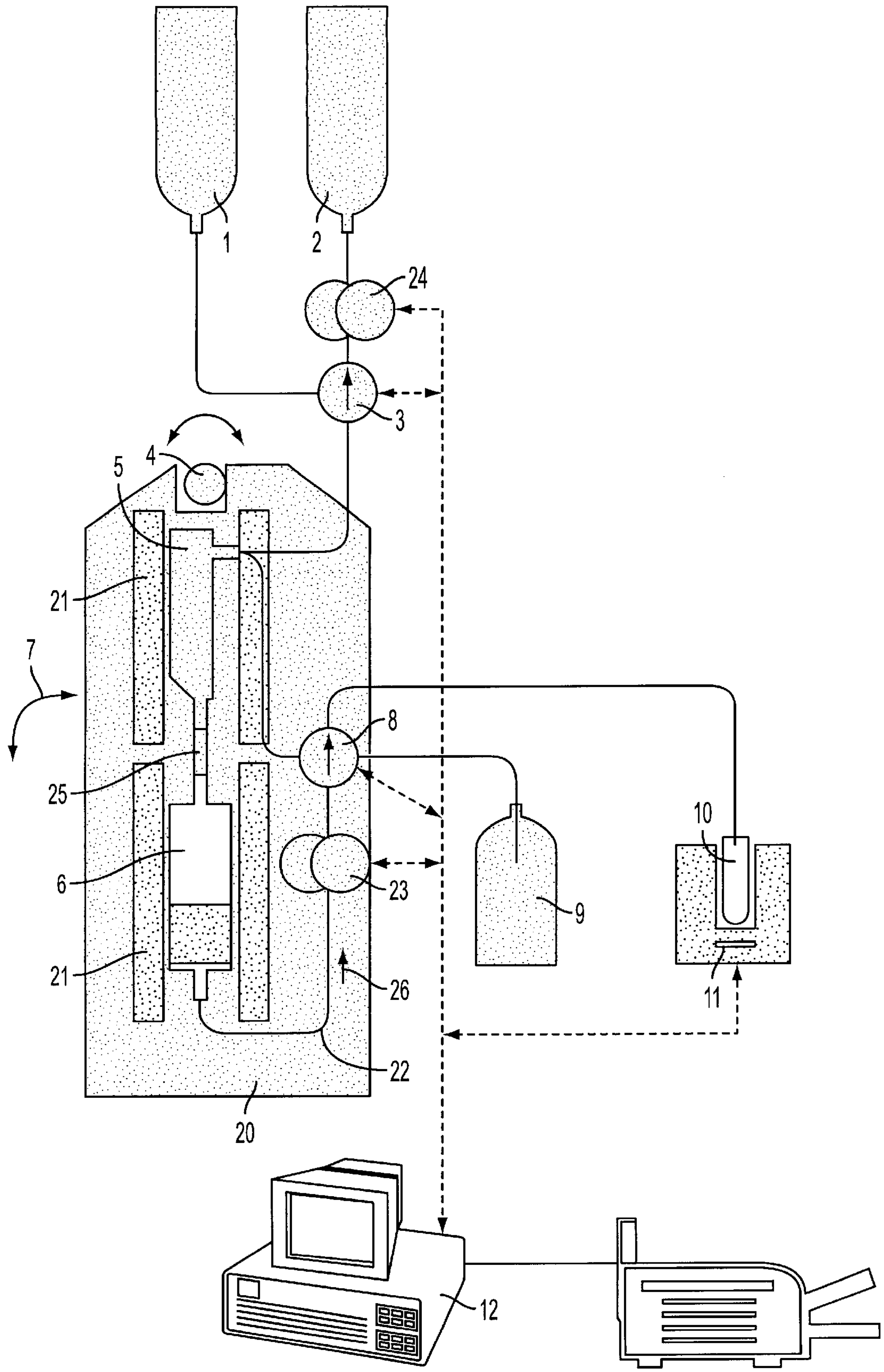
FIGURE

METHOD AND APPARATUS FOR PREPARING BI-213 FOR HUMAN THERAPEUTIC USE

The present invention refers to a method and an apparatus for preparing Bi-213 to be integrated into a medicament (radioimmunoconjugate) for a human therapeutic use.

The document EP 0 585 986 describes such a method and apparatus. Bi-213 is generated by decay of Ac-225. Due to the short half life the therapeutic use of Bi-213 requires either the administration of Bi-213 to a patient in a nuclear material processing plant or the handling of 10 to 50 mCi of Ac-225 in a hospital. Handling of such amounts of Ac-225 without particular protection would cause the radiation exposure limits (2 $\mu$Sv/h) and finger dose at contact to be exceeded (contact dose is about 15 rem/h), and is not allowed while a 50 mCi generator represents about $10^8$ Bq of Ac-225, whereas only $5 \cdot 10^3$Bq is allowed to be handled without protection.

The present invention therefore proposes a method and an apparatus which allows the preparation of Bi-213 as a medicament in a hospital, thereby respecting all rules for radioprotection and improving the performance of the Bi-213 elution.

The method according to the invention is defined in the appended claim 1, and the apparatus for implementing this method is defined in claim 5.

The invention will be described hereafter in more detail by means of a preferred embodiment and with reference to the enclosed drawings showing schematically an apparatus according to the invention.

The apparatus shown in the drawings consists mainly of a shielded container 20 mounted in a tilt frame 7 (schematically represented by a curved double arrow) which allows the container to be positioned either upright as shown or horizontally. The container 20 can further be shaken by vibration means 4, such as a rotating excenter activated by a motor (not shown).

In the container there are provided two volumes which are superimposed if the container is upright and are intended to receive a glass ampoule 5 (upper volume) and a ion exchange column 6 (lower volume) respectively. The volumes communicate with each other via a central channel 25. Both volumes are surrounded by shielding panels 21, made for example from lead in order to prevent radiation from passing through the container walls to the outside.

A circulation duct 22 incorporating a peristaltic circulation pump 23 and a valve 8 connect the lower end of the ion exchange column 6 to the upper end of the glass ampoule 5 thus allowing close circulation of a liquid medium through both volumes in the direction indicated by an arrow 26. The valve 8 is a three-way valve with three outlets. One outlet is connected to the glass ampoule 5 in order to insure the closed-loop circulation as stated above. The second outlet is connected to a waste bottle 9 and the third outlet leads to a vial 10 receiving the Bi-213 to be quantified and controlled in a GeLi well counter.

Two supply bottles 1 and 2 can be alternatively connected via a further valve 3 to the upper end of the glass ampoule 5. Bottle 1 is intended to supply a dissolving medium such as HCl with a small quantity of organic ion exchange resin whereas bottle 2 is intended to supply an elution medium such as HCl. A further pump 24, preferably of the peristaltic type, insures the quantified transfer of elution medium from the bottle 2 to the glass ampoule 5.

The entire system is supervised and controlled by a data processor 12 according to a predetermined sequence of method steps and in accordance with meter means such as a GeLi well-detector 11, which measures parameters such as activity and gamma-energy spectrum in the vial 10.

The data processor 12 is associated to a printer which can edit a certificate stating the quantity and purity of the Bi-213 solution in the vial as obtained by the recorded gamma energy spectrum and the counted Bi-213 activity. The inventive method can be performed by conveniently programming the data processor which automatically controls the tilt mechanism, the valves and the pumps.

The apparatus may be integrated in a vented glove box, possibly having lead shielded glass walls (not shown).

The apparatus is operated as follows:

Colloid-free actinium is obtained in a plant for processing nuclear materials by drying an actinium nitrate solution gained from ultra pure chemicals. The drying temperature is about 95° C. where all organic materials decompose which could have been introduced via purification by a resin ion exchanger.

The dried actinium is then conditioned in a glass ampoule 5 and transported to the hospital. At the hospital it is inserted into the container 20. Now, the container is tilted into the horizontal position and the shape of the glass ampoule is such that the (now horizontal) central channel 25 between the glass ampoule 5 and the ion exchange column 6 remains above-the liquid level of any fluid injected into the ampoule, as long as the container remains horizontal.

The dissolving medium, for example 2 Mol HCl, mixed with a small quantity of resin (e.g. 20 Vol % DOWEX 50WX8 generically known as cation resin 2–12% crosslinkage resin) referred to 100 Vol % dissolving medium, penetrates by gravity into the ampoule 5 and dissolves the dried actinium, the dissolution being enhanced by the vibrator means 4. After a predetermined time the shaking is stopped and the tilting mechanism 7 is activated in order to turn the container into the upright position as shown. The dissolved actinium is then absorbed in the ion exchange column 6. For washing an extra amount of dissolving medium is used by the opening again the valve 3. The excess solution is pumped by pump 23 through the valve 8 towards the waste bottle 9.

Thereafter the valve 3 is opened towards the bottle 2 containing an elution medium such as HCl. Pump 24 transfers a predetermined quantity of the elution medium into the glass ampoule 5. Then pump 23 circulates the elution medium through the glass ampoule 5, the ion exchanger 6 and the valve 8 which now establishes a communication from the pump 23 to the ampoule 5.

Due to this closed-loop circulation the predecessors Fr-221 and At-217 in the decay chain from Ac-225 and Bi-213 are steadily eluted and their radiolytical effect on the resin is reduced. Thus the circulation increases the yield of the Bi-213 elution and the performance of the Bi-213 generator as a whole.

After a certain elution time, that means if a sufficient quantity of Bi-213 is eluted, the valve 8 opens a communication between pump 23 and the vial 10 and the eluted Bi-213 is pumped to the vial.

To meet stringent quality criteria, the purity and quantity of Bi-213 which is later-on to be coupled to a monoclonal antibody or another carrier before being administered as radioimmunoconjugate to a patient, is determined by collecting the eluate in the GeLi well detector 11. The apparatus as described then collects the requested Bi-213 activity, hands out a vial of purified Bi-213 together with a certificate stating its purity and quantity as obtained by the recorded gamma energy spectrum and the counted Bi-213 activity.

The apparatus can be operated in the hospital. Due to its automated operation it does not need manual interventions.

Finally the method and apparatus according to the invention supply practically on-line a certified recording of purity and quantity of said isotope.

However, the invention is not restricted to the preferred embodiment as described above, especially as concerns the dissolving and the elution media and the structural details of the apparatus.

What is claimed is:

1. A method for preparing Bi-213 to be integrated in a radioimmunoconjugate for human therapeutic use, comprising a sequence of steps as follows:

a) an ampoule containing colloid-free actinium-225, obtained from drying and heating an actinium nitrate solution, is loaded into a container provided with radiation panels;

(b) a dissolving medium is poured into the ampoule to obtain a solution;

(c) the solution obtained in the ampoule is transferred into an ion exchange column;

(d) an elution medium is circulated continuously through the ion exchange column; and (e) at regular intervals an eluate containing eluted Bi-213, which grows by decay of Ac-225, is pumped towards a vial for quantification and quality control.

2. A method according to claim 1, characterized in that the container is shaken while the dissolving medium is being poured into the ampoule.

3. A method according to claim 1, characterized in that the dissolving medium is HCl mixed with a small quantity of ion exchange resin.

4. A method according to claim 1, characterized in that the elution medium is HCl.

5. An apparatus for preparing Bi-213 to be integrated in a radioimmunoconjugate for human therapeutic use, comprising a container, protected by radiation shielding panels, a first volume of said container intended to receive a transport ampoule and a second volume of said container intended to receive an ion exchange column are arranged in serial communication, said container mounted on a tilt frame allowing tilting of the container from a first, horizontal position for dissolution in which the first volume is located next to the second volume, into a second, vertical position in which said transport ampoule is above said ion exchange column for elution, a circulation duct including a circulating pump, provided to connect the ends of the two volumes which are remote from their interconnection channel, supply bottles containing a dissolving medium and an elution medium being connected via a valve to a transport ampoule and, data processing means provided to automatically control a tilt mechanism, valves and pumps and a GeLi well counter.

* * * * *